(12) United States Patent
Le et al.

(10) Patent No.: US 6,224,480 B1
(45) Date of Patent: May 1, 2001

(54) BLEND DOOR ASSEMBLY FOR CLIMATE CONTROL SYSTEMS

(75) Inventors: Vu Le, Ypsilanti; Bipin Parekh, Plymouth; Fred Butler, Oxford, all of MI (US)

(73) Assignees: TRW Inc., Lyndhurst, OH (US); Ford Motor Company, Dearborn, MI (US)

( * ) Notice: Subject to any disclaimer, the term of this patent is extended or adjusted under 35 U.S.C. 154(b) by 0 days.

(21) Appl. No.: 09/392,705

(22) Filed: Sep. 9, 1999

(51) Int. Cl.[7] ....................................................... B60H 1/02
(52) U.S. Cl. .............................. 454/160; 454/156; 62/408
(58) Field of Search ...................... 62/408, 404; 454/160, 454/156, 126, 121; 165/42

(56) References Cited

U.S. PATENT DOCUMENTS

| | | |
|---|---|---|
| 4,517,809 | 5/1985 | Hoyt . |
| 4,842,047 * | 6/1989 | Sakurada et al. . |
| 5,062,473 | 11/1991 | Ostrand et al. . |
| 5,162,020 | 11/1992 | Asano et al. . |
| 5,676,595 * | 10/1997 | Sumiya et al. .......................... 454/121 |
| 5,899,262 * | 5/1999 | Yamaguchi et al. .............. 454/121 X |
| 5,921,527 * | 7/1999 | Ikawa et al. ....................... 454/121 X |
| 6,048,263 * | 4/2000 | Uchida et al. ......................... 454/121 |

* cited by examiner

*Primary Examiner*—Corrine McDermott
*Assistant Examiner*—Chen-Wen Jiang
(74) *Attorney, Agent, or Firm*—Tarolli, Sundheim, Covell, Tummino & Szabo L.L.P.

(57) ABSTRACT

An assembly 10 for controlling the temperature of air flowing into the passenger compartment of a vehicle has a frame 20, an arcuate door 40, and an actuation assembly 50. The frame 20 defines an opening 21 through which air flows into the passenger compartment of the vehicle. The frame 20 also includes opposite arcuate tracks 25, 26. The arcuate door 40 moves to control airflow through the opening 21 and has side edges 41, 42 which are slidably received in the opposite arcuate tracks 25, 26. The arcuate door 40 and the opposite arcuate tracks 25, 26 maintain the same center of curvature during the sliding of the arcuate door 40 in the opposite arcuate tracks 25, 26. The actuation assembly 50 moves the arcuate door 40 along the opposite arcuate tracks 25, 26.

17 Claims, 3 Drawing Sheets

BLEND DOOR ASSEMBLY FOR CLIMATE CONTROL SYSTEMS

FIELD OF THE INVENTION

This invention relates to air handling systems for a vehicle, and more particularly to an assembly for controlling the temperature of air flowing into the passenger compartment of a vehicle.

BACKGROUND OF THE INVENTION

In a conventional vehicle air handling system, a heater core is mounted in an air duct downstream of an evaporator core. Engine coolant is circulated through the heater core to heat the air. For air conditioning, refrigerant is circulated through the evaporator core. Control of the air temperature is obtained by controlling the flow of air from the evaporator core to the heater core. For maximum cooling, all of the air flow from the evaporator core bypasses the heater core and travels directly to the passenger compartment without contacting the heater core. Alternatively, for maximum heating, all of the air flow from an inactive evaporator core passes through the heater core, where the air is heated, before traveling to the passenger compartment. Intermediate these two extremes, bypass flow and flow through the heater core mix to provide an air flow to the passenger compartment of an intermediate temperature.

The amount of air which bypasses the heater core and the amount of air which flows through the heater core are typically controlled by a movable member which moves to block flow from the evaporator core to the heater core or to block bypass flow from the evaporator core directly to the passenger compartment. The movable member may, in certain positions, allow both bypass flow and flow through the heater core. Normally, the movable member moves in a frame that has an opening through which the air flows. The movable member is in the nature of a door which blocks air flow through a portion of the opening and can totally block air flow to the heater core or totally block bypass air flow. It is desirable that movement of the door be accomplished reliably and with minimum effort.

SUMMARY OF THE INVENTION

In accordance the present invention, an assembly for controlling the temperature of air flowing into the passenger compartment of a vehicle has a frame, an arcuate door, and an actuation assembly. The frame defines an opening through which air flows into the passenger compartment of the vehicle. The frame also includes opposite arcuate tracks. The arcuate door moves to control air flow through the opening and has side edges which are slidably received in the opposite arcuate tracks. The arcuate door and the opposite arcuate tracks maintain the same center of curvature during the sliding of the arcuate door in the opposite arcuate tracks. The actuation assembly moves the arcuate door along the opposite arcuate tracks.

In accordance with another feature of the present invention, an assembly for controlling the temperature of air flowing into the passenger compartment of a vehicle has a frame, a single arcuate door, a single heater core, and an actuation assembly. The frame defines an opening for air flow into the vehicle and has an arcuate guide surface. The single arcuate door moves to control air flow through the opening and slidingly engages the arcuate guide surface. The single arcuate door and the arcuate guide surface have the same center of curvature. The single arcuate door maintains a constant center of curvature as the single arcuate door slidingly engages the arcuate guide surface. The single heater core heats a portion of the air flowing through the opening. The actuation assembly moves the single arcuate door along the arcuate guide surface.

BRIEF DESCRIPTION OF THE DRAWINGS

The foregoing and other features of the present invention will become apparent to one skilled in the art upon reading the following description of the present invention with reference to the accompanying drawings, wherein.

DESCRIPTION OF A PREFERRED EMBODIMENT

Figure 1:
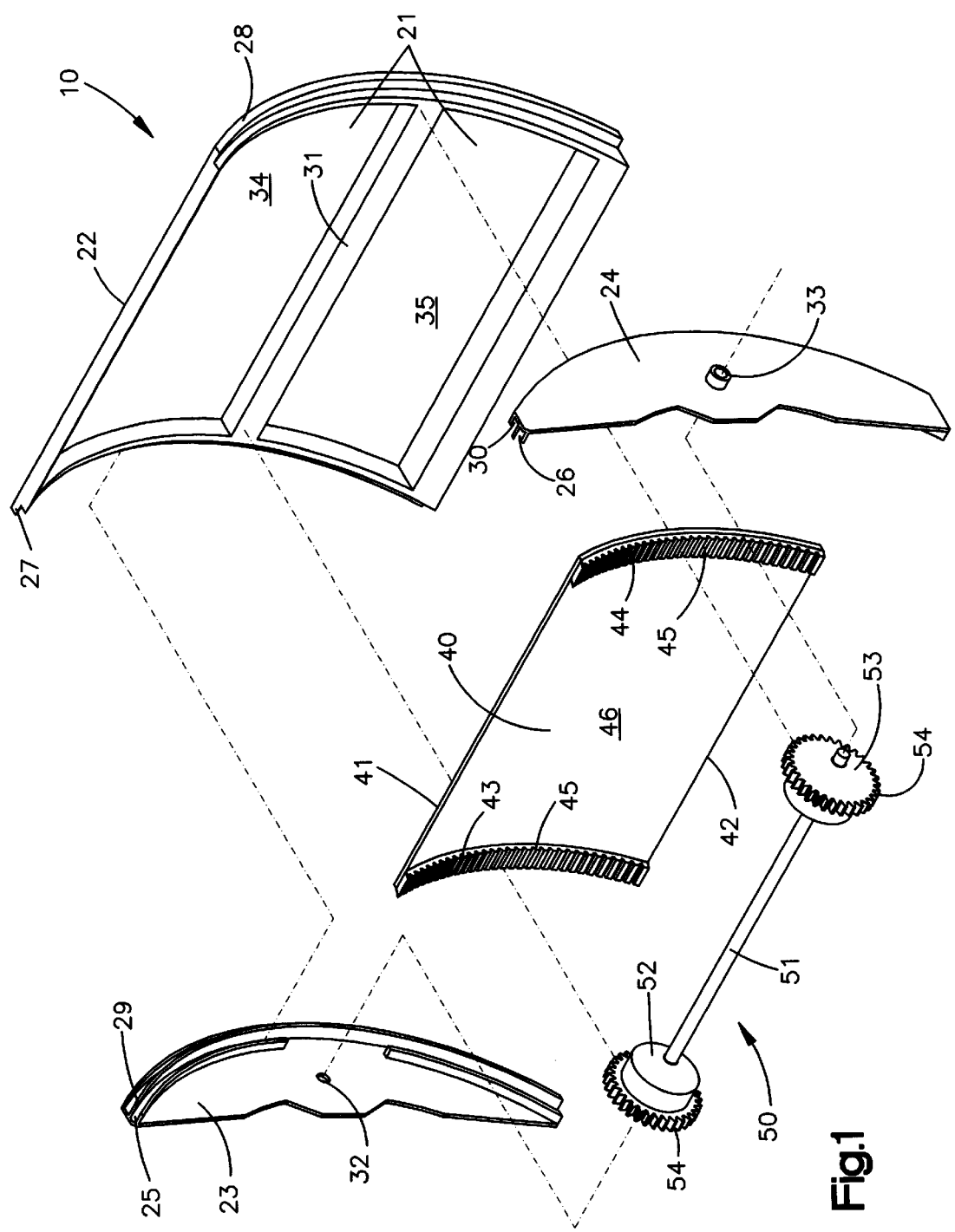
FIG. 1 is an exploded isometric view of parts of an assembly embodying the present invention.
Figure 2:
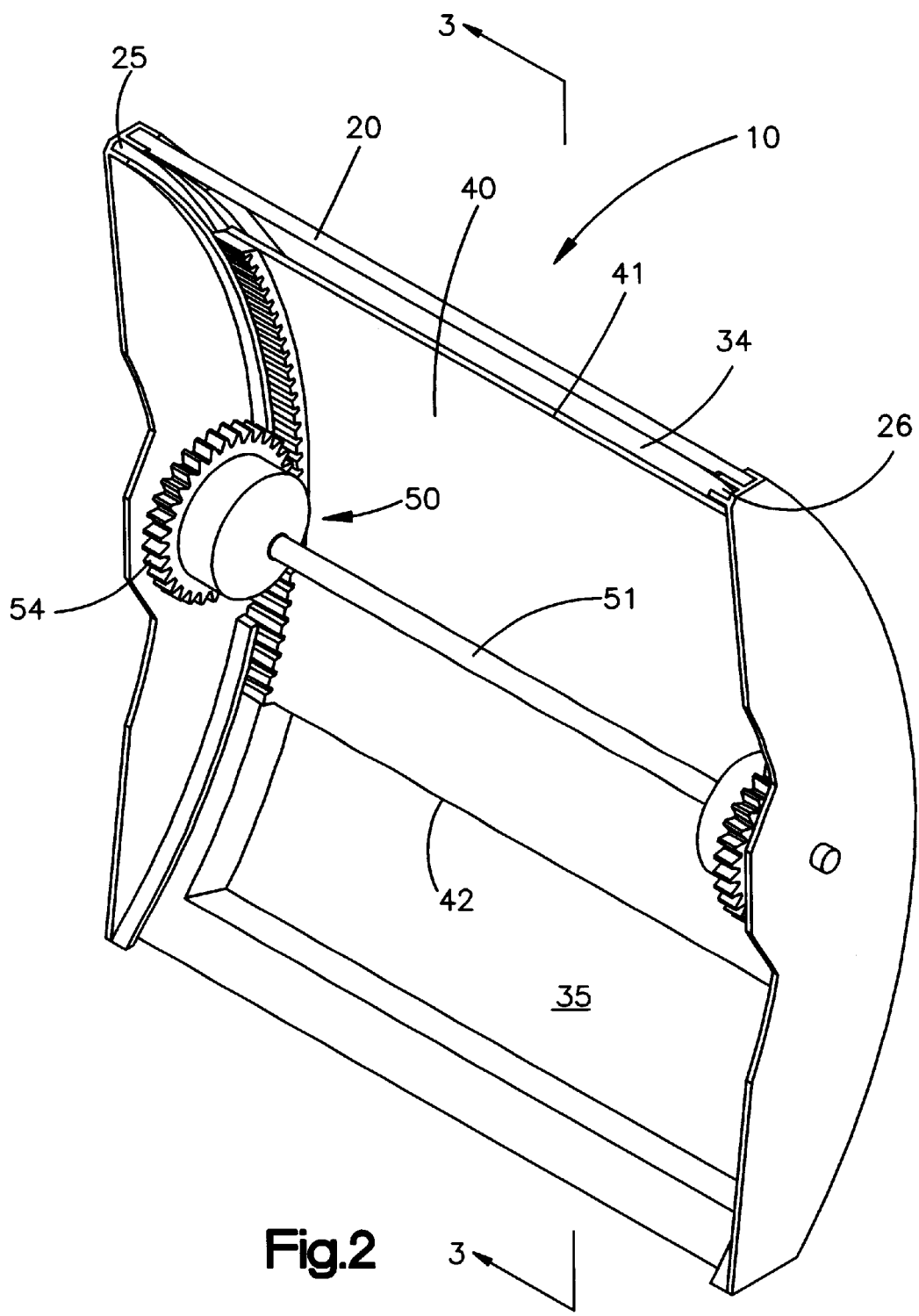
FIG. 2 is a rear isometric view of the interconnected assembly of FIG. 1.

As representative of the present invention, FIG. 1 and FIG. 2 illustrate an assembly 10 for controlling the temperature of air flowing into the passenger compartment of a vehicle. The assembly 10 includes a frame 20, an arcuate door 40, and an actuation assembly 50.

The frame 20 defines an opening 21 through which air flows into the passenger compartment of the vehicle. The frame 20 includes a center structure 22 and two side panels 23, 24, each having opposite arcuate tracks 25, 26 which comprise guide surfaces. Two tongues 27, 28 extend from opposite ends of the center structure 22. Each side panel 23, 24 has a groove 29, 30 for receiving a corresponding tongue 27, 28 of the center structure 22. Also, each side panel 23, 24 has apertures 32, 33 for receiving a shaft 51 from the actuation assembly 50. The center structure 22 also has a center support 31 which strengthens the frame 20 and extends across the opening 21 forming two windows 34, 35.

The arcuate door 40 moves to control air flow through the opening 21 and has side edges 41, 42 over which the air flows. Gear racks 43, 44 are located on a concave surface 46 of the arcuate door 40 for receiving the actuation assembly 50. The gear racks 43, 44 are slidably received in the opposite arcuate tracks 25, 26. The gear racks 43, 44 have teeth 45 protruding away from the concave surface 46 of the arcuate door 40. The arcuate door 40 and the opposite arcuate tracks 25, 26 maintain the same center of curvature during the sliding of the arcuate door 40 in the opposite arcuate tracks 25, 26. This is accomplished by both the arcuate door 40 and the opposite arcuate tracks 25, 26 being manufactured with the same radius of curvature. As a result, the arcuate door 40 has the same center of curvature, and incurs no bending moment, both before and after the arcuate door 40 is inserted into the opposite arcuate tracks 25, 26 during assembly of the frame 20 and the arcuate door 40. The opposite arcuate tracks 25, 26 will only impart a frictional shear force on the surface of the arcuate door 40 during movement of the arcuate door 40 along the opposite arcuate tracks 25, 26.

The actuation assembly 50 moves the arcuate door 40 along the opposite arcuate tracks 25, 26. The actuation assembly 50 includes a shaft 51 and two gears 52, 53. The shaft 51 is mounted for rotation in each of the apertures 32, 33 on the side panels 23, 24 of the frame 20. The gears 52, 53 have protruding teeth 54 located about the periphery of the gears 52, 53. These teeth 54 mesh with the protruding teeth 45 of gear racks 43, 44 on the concave surface 46 of the arcuate door 40. As the shaft 51 rotates in the apertures 32, 33, the teeth 54 of the gears 52, 53 engage the teeth 45 of the gear racks 43, 44 and move the arcuate door 40 through the arcuate path created by the opposite arcuate tracks 25, 26.

In operation, the arcuate door 40 partially blocks air flow through the opening 21 and has a position in the opposite arcuate tracks 25, 26 directing air flow through spaced apart portions 70, 71 of the opening 21 and across the end edges 41, 42 of the arcuate door 40. The spaced apart portions 70, 71 vary in area as the arcuate door 40 moves in the opposite arcuate tracks 25, 26 causing the amount of air flow through each of the spaced apart portions 70, 71 to vary.

The result of the above assembly 10 is a mechanical system requiring low effort for moving the arcuate door 40, and still allowing for an arcuate door 40 of sufficient thickness to resist bending due to the air flow.

The arcuate door 40 may be manufactured and constructed of any suitable material with a low surface coefficient of friction and a sufficient resistance to bending stresses. Injection-molded plastic is the preferred construction due to low fabrication cost and high durability. The remaining assembly 10 may also be constructed injection-molded plastic.

Figure 3:
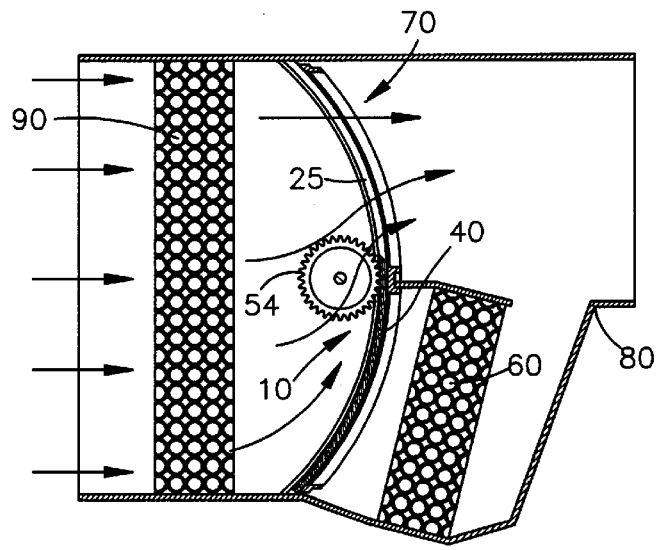
FIG. 3 is a schematic view along line "3—3" in FIG. 2 showing parts of FIG. 2 in one position.
Figure 4:
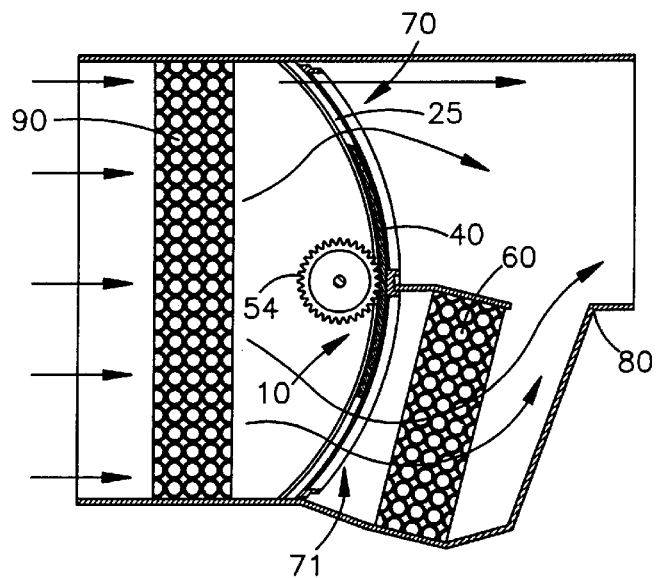
FIG. 4 is a view similar to FIG. 3 showing parts in a different position.
Figure 5:
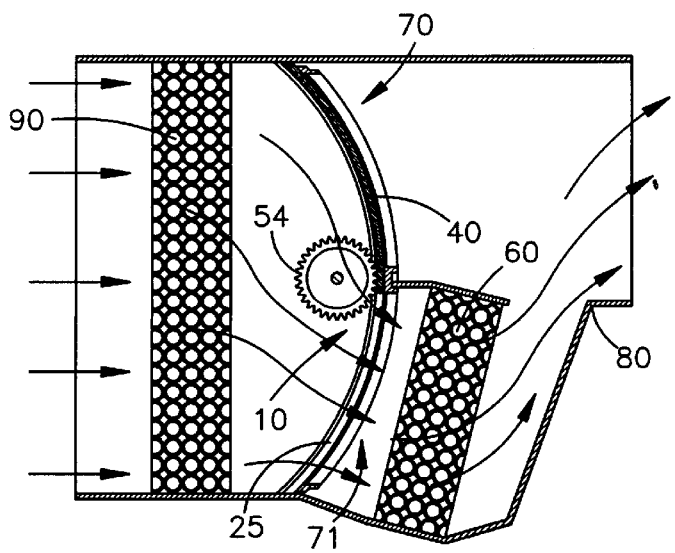
FIG. 5 is a view similar to FIG. 3 showing parts in still another position.

FIGS. 3, 4, and 5 illustrate another feature of the present invention. As illustrated, a means for heating one of the air flows, such as a single heater core 60, and a means for combining the air flow through each of the spaced apart portions 70, 71, such as a duct convergence 80, are located downstream of the arcuate door 40. The single heater core 60 heats a portion of the air flowing through only one of the spaced apart portions 70, 71 of the opening 21. An evaporator core 90 is located upstream of the air flow to provide air conditioning capability.

FIG. 3 illustrates the arcuate door 40 in a position blocking all air flow to the heater core 60. If the evaporator core 90 is active, this position of the arcuate door 40 provides maximum cooling for the passenger compartment of the vehicle. If the evaporator core 90 is inactive, this position of the arcuate door 40 provides ambient air circulation for the passenger compartment of the vehicle.

FIG. 4 illustrates the arcuate door 40 in a position allowing a portion of the air flow through the heater core 60 and a portion of the air flow to bypass the heater core 60. If the evaporator core 90 is active, this position of the arcuate door 40 provides intermediate cooling for the passenger compartment of the vehicle. If the evaporator core 90 is inactive, this position of the arcuate door 40 provides intermediate heating for the passenger compartment of the vehicle.

FIG. 5 illustrates the arcuate door 40 in a position directing all of the air flow through the heater core 60. If the evaporator core 90 is active, this position of the arcuate door 40 provides minimum cooling for the passenger compartment of the vehicle. If the evaporator core 90 is inactive, this position of the arcuate door 40 provides maximum heating for the passenger compartment of the vehicle.

From the above description of the invention, those skilled in the art will perceive improvements, changes and modifications. Such improvements, changes and modifications within the skill of the art are intended to be covered by the appended claims.

Having described the invention, the following is claimed:

1. An assembly for controlling the temperature of air flowing into the passenger compartment of a vehicle, said assembly comprising:

a frame defining an opening through which air flows into the passenger compartment of the vehicle, said frame having opposite arcuate tracks;

an arcuate door which is movable to control airflow through said opening, said arcuate door having side edges slidably received in said opposite arcuate tracks, said arcuate door and said opposite arcuate tracks maintaining the same center of curvature during the sliding of said arcuate door in said opposite arcuate tracks; and an actuation assembly associated with said arcuate door for moving said arcuate door along said opposite arcuate tracks, said opposite arcuate tracks imparting only frictional shear force on said arcuate door during movement of said arcuate door along said opposite arcuate tracks.

2. The assembly as defined in claim 1 wherein said arcuate door has the same radius of curvature throughout its extent before and after said arcuate door is received in said opposite arcuate tracks.

3. The assembly as defined in claim 1 wherein said arcuate door at least partially blocks air flow through said opening and has a position in said opposite arcuate tracks directing air flow through spaced apart portions of said opening and across opposite end edges of said arcuate door.

4. The assembly as defined in claim 3 wherein said spaced apart portions of said opening vary in area as said arcuate door moves in said opposite arcuate tracks causing the amount of air flow through each of said respective spaced apart portions of said opening to vary.

5. The assembly as defined in claim 4 wherein the air flow through one of said spaced apart portions of said opening is a first air flow and the air flow through another of said spaced apart portions of said opening is a second air flow and further including means for heating only one of said air flows.

6. The assembly as defined in claim 5 further including means for combining said first and second air flows after said one of said air flows is heated.

7. The assembly as defined in claim 1 wherein said actuation assembly comprises a gear and a shaft which rotate to move said arcuate door along said opposite arcuate tracks.

8. The assembly as defined in claim 7 wherein said gear includes teeth located about the periphery of said gear, said teeth meshing with a gear rack on said arcuate door.

9. The assembly as defined in claim 8 wherein said arcuate door has a concave surface and said gear rack includes teeth protruding away from said concave surface.

10. The assembly as defined in claim 1 wherein said frame comprises a center structure and two side panels, said center structure of said frame having two tongues extending therefrom, said two side panels of said frame each having a groove, each of said tongues being inserted into a corresponding groove during assembly of said frame.

11. An assembly for controlling the temperature of air flowing into the passenger compartment of a vehicle, said assembly comprising:

a frame defining an opening through which air flows into the passenger compartment of the vehicle, said frame having an arcuate guide surface;

a single arcuate door which is movable to control airflow through said opening, said single arcuate door having a first edge portion, a second edge portion opposite said first edge portion, and a central portion interposed between said first and second edge portions, said central portion being one piece with said first and second edge portions and being made from plastic such that said single arcuate door maintains sliding engagement with said arcuate guide surface, said first and second edge portions of said single arcuate door slidingly engaging said arcuate guide surface, said single arcuate door and said arcuate guide surface having the same center of curvature, said single arcuate door maintaining a constant center of curvature as said first and second edge portions of said single arcuate door slidingly engage said arcuate guide surface;

a single heater core which heats a portion of the air flowing through said opening; and an actuation assembly associated with said arcuate door for moving said arcuate door along said arcuate guide surface.

12. The assembly as defined in claim 11 wherein said actuation assembly comprises a gear and a shaft which rotate to move said arcuate door along said arcuate guide surface.

13. The assembly as defined in claim 11 wherein said frame comprises a center structure and two side panels; and said arcuate guide surface comprises two opposite arcuate tracks, one each of said two opposite arcuate tracks located on each of said two side panels of said frame.

14. The assembly as defined in claim 13 wherein said center structure includes a center support and two windows, said two windows defining said opening.

15. The assembly as defined in claim 11 wherein said assembly further includes an evaporator core which cools the air flowing into said opening.

16. An assembly for controlling the temperature of air flowing into the passenger compartment of a vehicle, said assembly comprising:

a frame defining an opening through which air flows into the passenger compartment of the vehicle, said frame having opposite arcuate tracks;

an arcuate door which is movable to control airflow through said opening, said arcuate door having side edges slidably received in said opposite arcuate tracks, said arcuate door and said opposite arcuate tracks maintaining the same center of curvature during the sliding of said arcuate door in said opposite arcuate tracks; and an actuation assembly associated with said arcuate door for moving said arcuate door along said opposite arcuate tracks, said frame having at least one tongue and at least one groove, said at least one tongue being inserted into said at least one groove during assembly of said frame.

17. An assembly for controlling the temperature of air flowing into the passenger compartment of a vehicle, said assembly comprising:

a frame defining an opening through which air flows into the passenger compartment of the vehicle, said frame having opposite arcuate tracks;

an arcuate door which is movable to control airflow through said opening, said arcuate door having gear racks slidably received in said opposite arcuate tracks, said arcuate door and said opposite arcuate tracks maintaining the same center of curvature during the sliding of said gear racks in said opposite arcuate tracks; and an actuation assembly associated with said gear racks of said arcuate door for moving said arcuate door along said opposite arcuate tracks.

* * * * *